United States Patent [19]

Wolf et al.

[11] Patent Number: 4,664,247
[45] Date of Patent: May 12, 1987

[54] CONVEYOR BRAKE CONTROL

[75] Inventors: Joachim E. Wolf, Monroeville; Charles W. Maiden, Brentwood; Andrew P. Kruper, Penn Hills; Frederick O. Johnson, Monroeville, all of Pa.

[73] Assignee: Westinghouse Electric Corp., Pittsburgh, Pa.

[21] Appl. No.: 605,041

[22] Filed: Apr. 30, 1984

[51] Int. Cl.$^4$ .................................................. B65G 43/00
[52] U.S. Cl. ...................................... 198/323; 198/856; 192/9; 303/95
[58] Field of Search ............... 198/322, 323, 330, 854, 198/855, 856; 192/0.076, 9; 303/95, 96, 98, 100; 188/181 C; 303/20

[56] References Cited

U.S. PATENT DOCUMENTS

| | | | |
|---|---|---|---|
| 3,519,805 | 7/1970 | Thorne-Booth | 303/108 |
| 3,985,400 | 10/1976 | Iizuka et al. | 188/181 C |
| 4,084,859 | 4/1978 | Bull et al. | 303/20 X |
| 4,231,452 | 11/1985 | Kraft | 188/171 |

FOREIGN PATENT DOCUMENTS 0033484 3/1979 Japan .................................. 198/323

Primary Examiner—Robert J. Spar
Assistant Examiner—D. Glenn Dayoan
Attorney, Agent, or Firm—D. R. Lackey

[57] ABSTRACT

A transportation apparatus having improved brake control. The actual speed of the transportation apparatus is compared with a reference speed signal, and when the actual speed exceeds the reference speed a brake is applied to slow the transportation apparatus. Rather than simply applying the full torque of the brake abruptly, the present invention discloses an apparatus for pulse duration modulating the control signal for controlling the brake. The brake responds to the average of the pulse duration modulated control signal such that braking torque is applied gradually and essentially linearly. The device can also be used in an acceleration situation to provide gradual acceleration of the transportation apparatus.

12 Claims, 8 Drawing Figures

CONVEYOR BRAKE CONTROL

BACKGROUND OF THE INVENTION

1. Field of the Invention

This invention relates generally to conveying apparatus, and more specifically to improved braking control for conveying apparatus.

2. Description of the Prior Art

Escalators are provided with an electrically released, mechanically applied brake capable of stopping an up or down traveling escalator with any load less than the design load of the brake.

In the down-operating mode, when a stop command is initiated, the escalator may begin to travel faster, if there is a sufficient load, unless the brake is energized simultaneously with the stop command. To avoid this situation, braking action should occur as soon as the power is removed from the escalator. With the escalator fully loaded in down operation and the brake applied continuously, it may still take several inches of travel to bring the escalator to a complete stop. With no load in down operation and the brake applied at the same instant as the stop signal, the escalator may stop in approximately 1.5 inches of travel. This deceleration is too rapid, and it would therefore be desirable to modulate the braking action in some manner so that the stopping distance is approximately the same for both the fully loaded and unloaded down traveling escalator. Likewise, it is desirable to obtain the same deceleration rate for all load conditions.

When the escalator is operating in the up mode, and the brake is energized when the stop is initiated, the escalator may stop within approximately 1.5 inches under any load condition from no load to full load. If the brake is not energized with the stop command, the escalator may stop after approximately 16 inches of travel for no load and about 4 inches for full load. If loaded, the escalator reverses unless the brake is applied. It is possible to use a flywheel to extend escalator travel in the up direction to obtain a smoother deceleration.

It is well known in the art of conveying apparatus that a more uniform deceleration rate may be obtained for different travel directions and loads by using a feedback scheme. In such a system, a reference signal representing the desired acceleration or deceleration (or speed) of the conveying apparatus is compared to a signal representing the actual acceleration or deceleration (or speed) thereof. The difference signal can then be used to control a motor, for an acceleration situation, or a brake, for a deceleration situation. Many examples of such systems exist in the art.

In vertical transportation systems, for example, U.S. Pat. No. 3,589,474 which is assigned to the assignee of the present invention, discloses a reference signal and means for comparing the reference signal with the actual elevator speed to control elevator deceleration. Similar systems are also available in horizontal transportation apparatus. For instance, U.S. Pat. No. 3,519,805, which is assigned to the same assignee as the present invention, discloses a closed-loop acceleration control system wherein the actual acceleration or deceleration of a vehicle is fed back for comparison with a desired vehicle acceleration or deceleration profile. The difference signal is used to control the stopping of the vehicle such that the passengers remain comfortable as the vehicle comes to a stop. U.S. Pat. No. 4,231,452, which is assigned to the assignee of the present invention, also discloses a similar feedback scheme as applied to escalators. The actual escalator speed is compared to a deceleration speed pattern and the difference signal is used to control the solenoid of a brake in an analog fashion. That is, the brake is applied and released gradually using mechanical springs and dashpots, electrically-modeled dashpots, or a feedback scheme for tracking a predetermined speed pattern. U.S. Pat. No. 3,701,414 discloses yet another similar system applied to conveyors. Here again, a reference signal is compared to a signal representing the speed of the conveyor to produce a command signal. The command signal is then used to decelerate the conveyor through a brake assembly.

One problem with the prior art braking and acceleration schemes discussed above is that the comparison technique provides an on/off (i.e., pulse-based or two state) braking or acceleration signal. It would be desirable to in some way modulate the braking or acceleration signal to allow gradual, instead of abrupt, application.

SUMMARY OF THE INVENTION

Briefly, the present invention is a new and improved braking system for any transportation device wherein the actual vehicle speed is compared with a reference speed to control the acceleration or deceleration of the vehicle. The resulting control signal is modulated to provide gradual acceleration or deceleration.

BRIEF DESCRIPTION OF THE DRAWINGS

The invention may be better understood and further advantages and uses thereof more readily apparent when considered in view of the following detailed description of exemplary embodiments, taken with the accompanying drawings in which.

DESCRIPTION OF THE PREFERRED EMBODIMENTS

Figure 1:
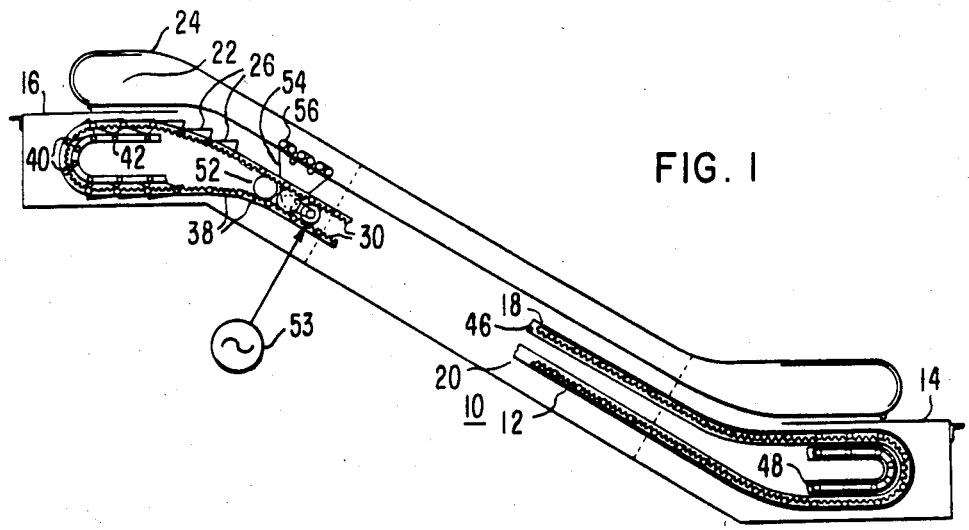
FIG. 1 is an elevational view of an escalator, which may be constructed according to the teachings of the present invention.

Referring now to FIG. 1, there is shown an escalator 10 of the type that may utilize the teachings of the present invention.

The escalator 10 employs a conveyor 12 for transporting passengers between a first or lower landing 14 and a second or upper landing 16. The conveyor 12 is of the endless type, having an upper load bearing run 18 on which passengers stand while being transported between the upper landing 16 and the lower landing 14. The escalator 10 also has a lower return run 20. A balustrade 22 is disposed above the conveyor 12 for guiding a continuous flexible handrail 24.

The conveyor 12 includes a plurality of steps 26, only a few of which are shown in FIG. 1. The steps 26 are each clamped to a step axle (not shown in FIG. 1) and move in a closed path. The conveyor 12 can be driven by any one of the well-known techniques, including a modular drive arrangement disclosed in U.S. Pat. No. 3,677,388, which is assigned to the same assignee as the present invention.

As disclosed in U.S. Pat. No. 3,677,388, the conveyor 12 includes an endless belt 30 having first and second sides, with each side formed of toothed links 38, interconnected by the step axles to which the steps 26 are connected. The steps 26 are supported by main and trailer rollers 40 and 42, respectively, at opposite sides of the endless belt 30. The main and trailer rollers 40 and 42 cooperate with support and guide tracks 46 and 48, respectively, to guide the steps 26 in an endless path or loop.

The steps 26 are driven by a modular drive unit 52, powered by a power source 53, that includes sprocket wheels and a drive chain for engaging the links 38. The modular drive unit 52 includes a handrail drive pulley 54, on each side of the conveyor 12, for driving a handrail unit 56.

Figure 2:
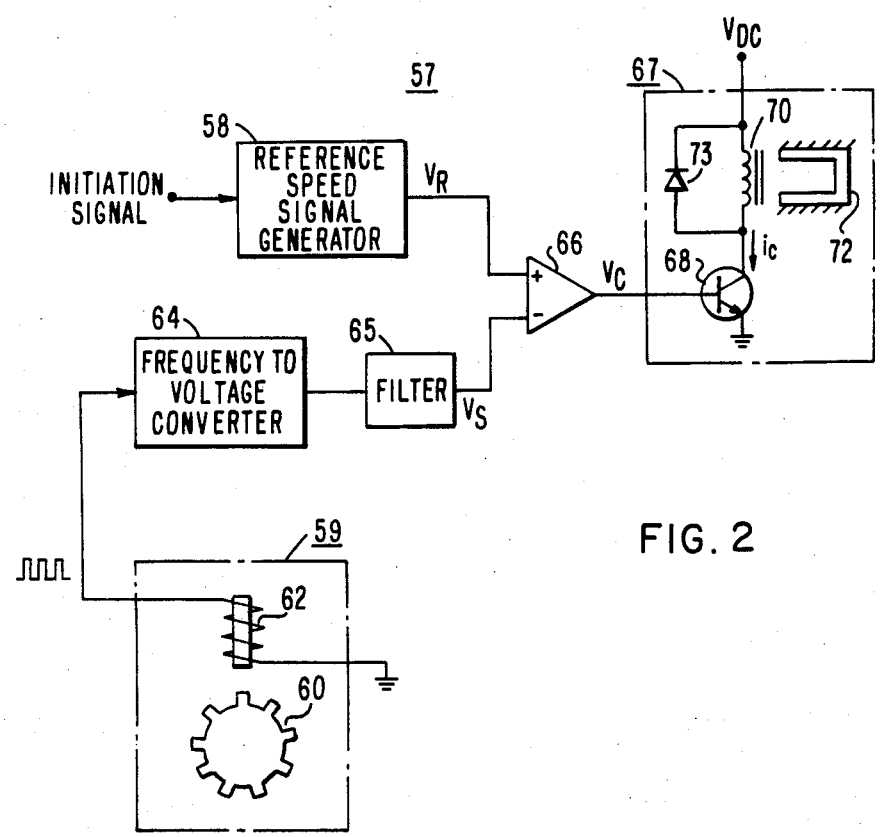
FIG. 2 is a partial block and partial schematic diagram of the brake control system of the present invention.

Turning to FIG. 2, there is shown an escalator brake control system 57 including a reference speed signal generator 58 having an initiation signal input thereto and producing a reference signal, designated $V_R$. A speed sensor 59 includes a toothed wheel 60 driven in synchronism with a selected component of the modular drive unit 52, and a sensor 62 disposed to detect the teeth of the toothed wheel 60, thereby measuring the speed of the escalator 10. The sensor 62 can be of an optical or magnetic type. The signal from the sensor 62 is input to a frequency-to-voltage converter 64. An output signal from the frequency-to-voltage converter 64 is input to a filter 65 for producing a speed signal designated $V_S$. A non-inverting input terminal of a comparator 66 is responsive to the signal $V_R$, and an inverting input terminal thereof is responsive to the signal $V_S$. The comparator 66 produces a signal $V_C$. The signal $V_C$ is fed to a base terminal of a transistor 68. An emitter terminal thereof is connected to ground, and a collector terminal thereof is connected to a dc power supply via a brake control coil 70. A brake shoe 72 is controlled by the brake control coil 70. A diode 73 is connected across the brake control coil 70 such that a cathode terminal of the diode 73 is connected to the dc power supply. The transistor 68, the brake control coil 70, the brake shoe 72, and the diode 73 constitute the brake 67.

In operation, the speed sensor 59 generates an escalator speed signal. The sensor 62 is mounted in proximity to the toothed wheel 60, which may be mounted on the brake shaft of the escalator 10. One example of such a mounting arrangement is disclosed in the above-mentioned U.S. Pat. No. 4,231,452. In one embodiment of the present invention the sensor 62 is a magnetic sensor that produces a magnetic field that is changed by the approach and passing of a tooth of the toothed wheel 60. This change produces a voltage in the sensor 62 exactly as in a conventional electrical generator. In this manner, the sensor 62 converts mechanical rotation, representing the speed of the escalator 10, into a pulse train having a frequency directly proportional thereto.

Figure 3:
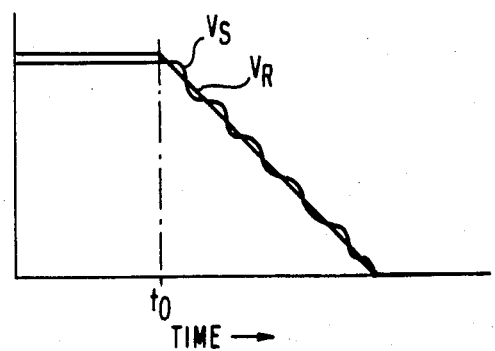
FIG. 3 is a graph showing the relationship between the reference speed signal and actual speed signal as discussed in conjunction with FIG. 2.

In response to the initiation signal, the reference speed signal generator 58 produces the declining reference signal $V_R$ that simulates the desired stopping speed profile in the form of a ramp voltage. The ramp voltage may be generated, for example, by an RC circuit with the capacitor discharging (or charging through a constant current source for acceleration). The reference signal $V_R$ is shown in FIG. 3, wherein at time $t_o$ the initiation signal causes production of the declining ramp voltage. The initiation signal can be generated by a variety of conditions. For instance, if the escalator or handrail experiences an overspeed or underspeed condition the initiation signal can be generated. Also, the initiation signal can be generated by an escalator stop signal generated manually, or automatically, by a skirt switch or broken chain switch. The initiation signal also disconnects the power source 53 from the modular drive unit 52.

The actual speed of the escalator oscillates slowly about the reference speed as the brake 67 is applied. The pulse train, representing escalator speed and produced by the speed sensor 59, is converted to a slowly varying dc signal by the frequency-to-voltage converter 64. The actual frequency of the varying dc signal depends on the characteristics of the brake 67 and the escalator system. Also, due to deliberate selection of less-than-optimum filtering in the filter 65, a high frequency component is deliberately superimposed on the slowly varying dc signal. The amplitude of the high-frequency component is controlled by the amount of filtering (capacitance) in the filter 65. This amplitude influences the duty cycle and pulse width of $V_C$, as discussed hereinbelow. The frequency of the high-frequency component must be much greater than the frequency of the slowly varying dc signal, and is preferably about 1000 Hz.

Figure 4A:
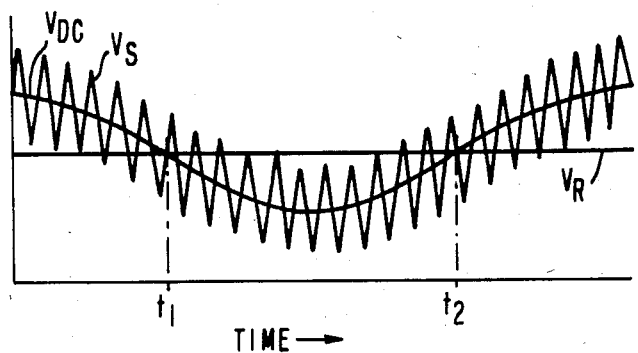
FIG. 4A is a close-up of one segment of the graph of FIG. 3.

FIG. 4A, a detailed close-up of the signals $V_S$ and $V_R$ from FIG. 3, illustrates this high-frequency component in slightly exaggerated form. The slowly varying dc signal from the frequency-to-voltage converter 64 is labeled $V_{DC}$ in FIG. 4A. The signal from the filter 65, the slowly varying dc with the high-frequency component, is labeled $V_S$. The reference signal $V_R$ is shown simply as a straight horizontal line. It is recognized, however, that the signal $V_R$ actually declines in amplitude over time as shown in FIG. 3.

The speed signal $V_S$ and the reference signal $V_R$ are adjusted with respect to their relative amplitudes so that the maximum ramp amplitude is approximately equal to the signal $V_S$ corresponding to the nominal speed of the escalator 10. The signals $V_S$ and $V_R$ are compared in the comparator 66. The control signal $V_C$ from the comparator 66 is either on or off depending on the algebraic difference between the two signals input thereto. The control signal $V_C$ controls the transistor 68.

Under steady-state conditions, the reference signal $V_R$ is greater than the speed signal $V_S$ and therefore the control signal $V_C$ is high. See FIG. 3. The transistor 68 is on and the current $i_c$ through the brake control coil 70 holds the brake 72 off. When the reference speed signal generator 58 receives the initiation signal the amplitude of the reference signal $V_R$ declines, and eventually the speed signal $V_S$ exceeds the reference signal $V_R$. Now the control signal $V_C$ goes low, the transistor 68 turns off such that $i_c = 0$, and the brake 72 is applied. Note that this scheme provides fail-safe operation, i.e., maximum braking torque is applied when a power failure occurs.

Application of the brake 72 slows the escalator 10 as illustrated by the declining speed signal $V_S$ in FIG. 3.

Figure 4B:
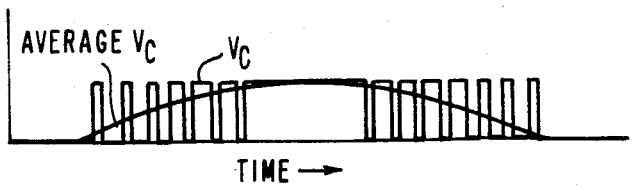
FIG. 4B is a graph of the control signal discussed in conjunction with FIG. 2.

FIGS. 4A and 4B illustrate operation of the escalator brake control system 57 when the reference signal $V_R$ is a declining ramp and the brake 72 is applied. Also, the effect of the high frequency component of the speed signal $V_S$ is clearly illustrated in FIGS. 4A and 4B. When $V_R$ is greater than $V_S$ in FIG. 4A, $V_C$ in FIG. 4B is high, the transistor 68 is on, $i_c \neq 0$, and no braking torque is applied. When $V_S$ is greater than $V_R$, $V_C$ is low, the transistor 68 is off, $i_c = 0$, and the brake 72 is applied. Note that the high frequency component causes the control signal $V_C$ of FIG. 4B to change state often and at irregular intervals. Note that if the high-frequency component was absent, the escalator speed would be represented by $V_{DC}$. Then, during the interval $t_1$ to $t_2$ the actual speed would drop below the reference speed. Therefore, the control signal $V_C$ would go low at $t_1$ and high at $t_2$ and the brake 72 would be applied continuously during this interval. Due to the high frequency component, however, the signal $V_C$ comprises several pulses of varying width prior to and following the $t_1$ to $t_2$ interval. The duty cycle of the pulses forming the control signal $V_C$ varies gradually from 100% through 0% and back to 100%, so that the average of the signal $V_C$ changes gradually instead of abruptly. The brake control coil 70 follows essentially the gradual variation in the signal $V_C$, because the inductance thereof filters the rapid pulse variations. Also, the diode 73 provides "free wheeling" current through the brake coil 70 while the transistor 68 is not conducting. The net effect is application of the brake in a gradual or quasi-analog fashion rather than a two-state on/off fashion. This technique provides smoother and quicker control, and a closer matching of the speed of the escalator 10 to the reference speed signal $V_R$ at all times. A similar technique can also be used for escalator start-up, the only difference being an increasing ramp for the reference speed signal $V_R$.

Figure 5:
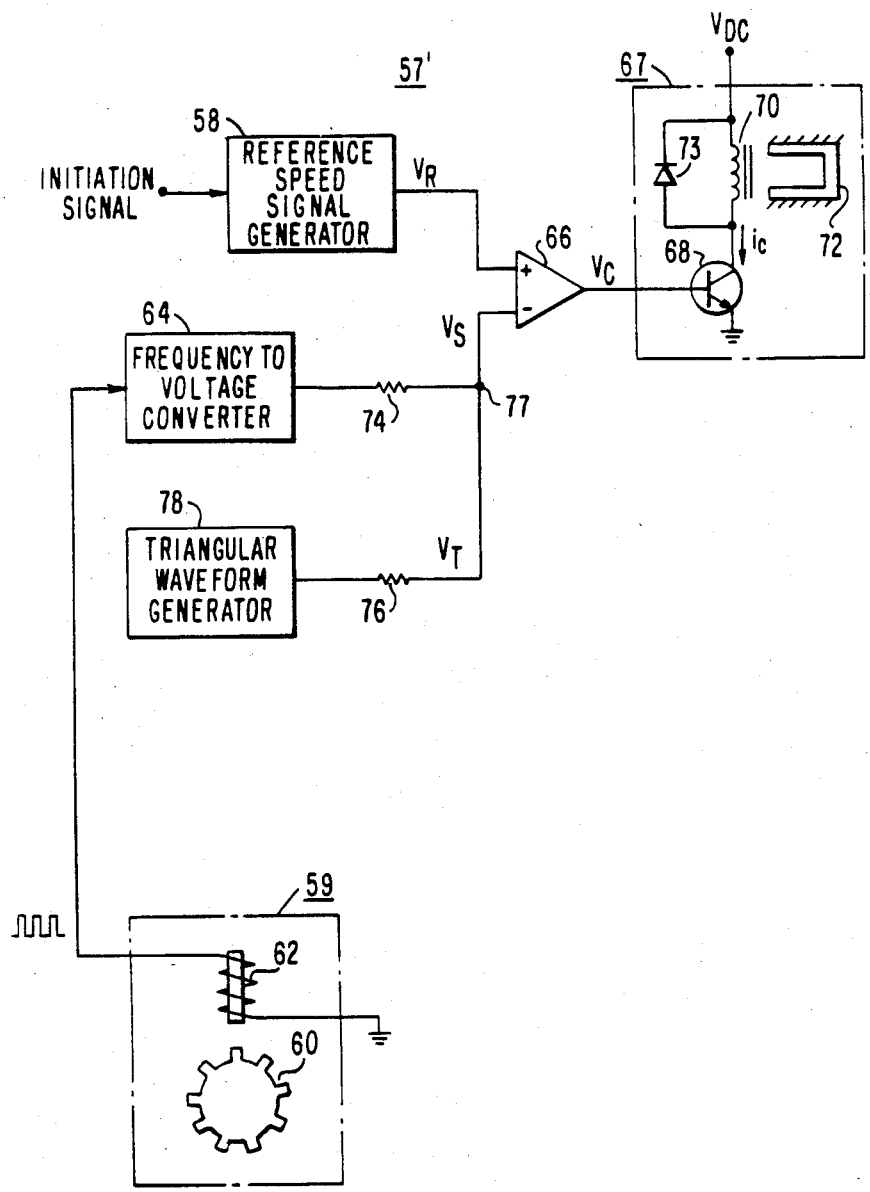
FIG. 5 is a second embodiment of the brake control system illustrated in FIG. 2.
Figure 7:
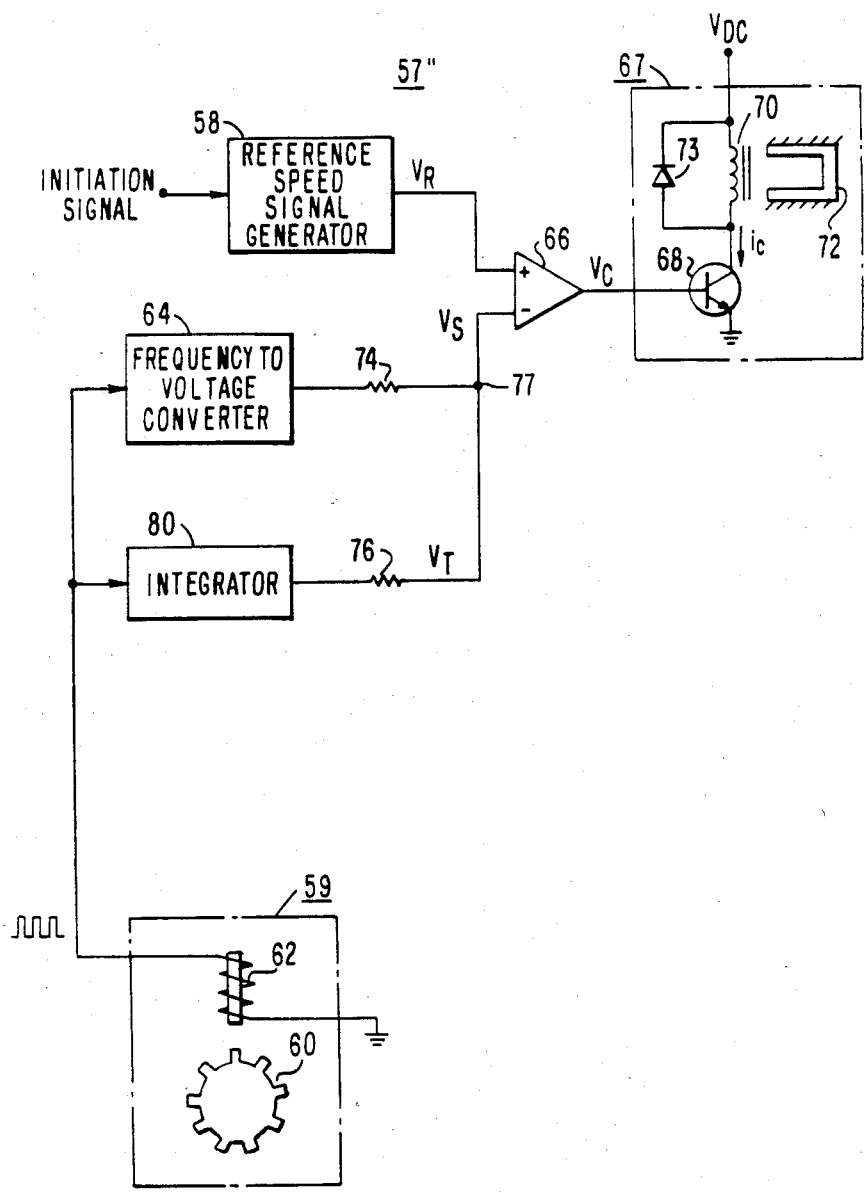
FIG. 7 is a third embodiment of the brake control system illustrated in FIG. 2.

There are many other techniques for imparting a high frequency component to the signal from the frequency-to-voltage converter 64. Two such techniques are illustrated in FIGS. 5 and 7. The components of FIGS. 5 and 7 are identical in structure and function to the components bearing identical reference characters in FIG. 2.

Turning to FIG. 5, there is shown an escalator brake control system 57' including a triangular waveform generator 78 connected to a node 77 via a resistor 76. The frequency-to-voltage converter 64 is also connected to the node 77 via a resistor 74. The signal $V_S$, including the high frequency component, is formed at the node 77. The triangular waveform generator 78 is selected to produce a triangular wave having a frequency much greater than the frequency of the control signal $V_C$. The triangular waveform is added to the slowly varying signal from the frequency-to-voltage converter 64 at the node 77 to produce the speed signal $V_S$ illustrated in FIG. 4A.

The escalator brake control system 57' can also be used where the speed sensor 59 is a dc generator such as is often used as a handrail speed sensor. Such a dc generator produces a dc voltage proportional to speed, allowing elimination of the frequency-to-voltage converter 64. In this embodiment, the dc generator would be connected directly to the resistor 74.

Figure 6:
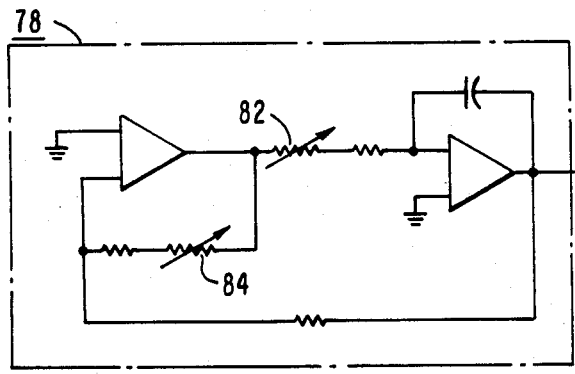
FIG. 6 is a schematic diagram for one embodiment of the triangular waveform generator of FIG. 5.

One embodiment of the triangular waveform generator 78 is shown in FIG. 6. This well-known embodiment is op-amp based with feedback and includes variable resistors 82 and 84 for controlling the frequency and amplitude, respectively, of the triangular wave signal.

FIG. 7 illustrates another embodiment for imposing a high frequency component on the signal from the frequency-to-voltage converter 64. In FIG. 7 this is accomplished by integrating the pulses from the speed sensor 59 in an integrator 80 and adding the resultant triangular waveform to the signal from the frequency-to-voltage converter 64 at the node 77. This forms the signal $V_S$ illustrated in FIG. 4A.

The disclosed invention can also be embodied with sensing and control means to operate on acceleration or deceleration of the escalator 10, instead of speed as discussed above.

What is claimed is:

1. Transportation apparatus comprising:

transporting means;

sensor means for measuring the speed of said transporting means and for producing an actual speed signal in analog form, wherein said actual speed signal has dc and ac components;

means for producing an initiation signal when it is required to stop said transporting means;

means responsive to said initiation signal for producing a reference speed signal in analog form;

comparator means for comparing said reference speed and actual speed signals;

said comparator means producing a control signal having a first state when said reference speed signal exceeds said actual speed signal, and having a second state when said actual speed signal exceeds said reference speed signal;

said control signal switching between said first and second states as a function of the frequency of the ac component of said actual speed signal and the difference between said actual and reference signals, when the magnitude of the actual speed signal has a predetermined relationship relative to the magnitude of the reference speed signal;

and brake means energized by said control signal, with the frequency of the ac component and the response time of said brake means being such that said brake means is responsive to the average of said control signal as the control signal switches between said first and second states, for smoothly controlling the speed of said transporting means while causing said actual speed signal to closely track said reference speed signal.

2. The transportation apparatus of claim 1 wherein the transporting means is an escalator.

3. The transportation apparatus of claim 1 wherein the transporting means includes a drive unit connectable to a source of electrical power, with the initiation signal being produced when electrical power to the drive unit is removed.

4. The transportation apparatus of claim 1 wherein the sensor means includes:

a toothed wheel driven in response to movement of the transporting means;

a sensor fixedly mounted proximate to said toothed wheel;

said sensor providing an output signal which changes whenever a tooth of said toothed wheel passes said sensor, such that said output signal is in the form of a pulse train having a frequency responsive to the speed of the transporting means;

frequency-to-voltage conversion means responsive to said output signal, wherein said frequency-to-voltage conversion means includes filter means selected to provide the actual speed signal in the form of a dc signal having an ac component related to the frequency of said pulse train.

5. The transportation apparatus of claim 1 wherein the actual speed signal includes a dc signal which varies at a relatively low frequency as the actual speed signal tracks the reference speed signal, with said varying dc signal having an ac component superimposed thereon, and wherein the frequency of said ac component greatly exceeds the frequency of said varying dc signal.

6. A transportation apparatus for providing smooth deceleration of a load, said transportation apparatus comprising:
   transporting means;
   sensor means for measuring the speed of said transporting means and for producing an actual speed signal, in analog form, representative thereof;
   means for producing an initiation signal when it is required to stop said transporting means;
   means for producing a triangular wave signal;
   means for adding said triangular wave signal and said actual speed signal to produce a modified speed signal;
   means responsive to said initiation signal for producing a reference speed signal;
   comparator means for comparing said reference speed and modified speed signals;
   said comparator means producing a control signal having a first state when said reference speed signal exceeds said modified speed signal, and having a second state when said modified speed signal exceeds said reference speed signal;
   said control signal switching between said first and second states as a function of the frequency of said triangular wave signal component of said modified speed signal and the difference between said modified speed signal and said reference signal;
   and brake means responsive to said control signal for controlling the speed of said transporting means, with the response time of said brake means and the frequency of said triangular wave signal providing a braking effort responsive to the average of said control signal, to cause said actual speed signal to smoothly track said reference speed signal.

7. A transportation apparatus for providing smooth deceleration of a load, said transportation apparatus comprising:
   transporting means;
   sensor means for measuring the speed of said transportation means and for producing an actual speed signal representative thereof, wherein said actual speed signal has a high frequency component;
   means for producing an initiation signal when it is required to stop said transporting means;
   means responsive to said initiation signal for producing a reference speed signal;
   comparator means for comparing said reference speed and actual speed signals;
   said comparator means producing a control signal which is in a first state when said reference speed signal exceeds said actual speed signal, and in a second state when said actual speed signal exceeds said reference speed signal;
   the high-frequency component of said actual speed signal causing the first and second states of said control signal to have varying durations;
   and brake means responsive to said control signal for controlling the speed of said transporting means, with the response time of said brake means and the frequency of said high-frequency component providing a braking effort responsive to the average of said control signal, to cause said actual speed signal to smoothly track said reference speed signal.

8. Transportation apparatus comprising:
   transporting means;
   sensor means for measuring the deceleration of said transporting means and for producing an actual deceleration signal in analog form, wherein said actual deceleration signal has dc and ac components;
   means for producing an initiation signal when it is required to stop said transporting means;
   means responsive to said initiation signal for producing a reference deceleration signal in analog form;
   comparator means for comparing said reference deceleration and actual deceleration signals;
   said comparator means producing a control signal having a first state when said reference deceleration signal exceeds said actual deceleration signal, and having a second state when said actual deceleration signal exceeds said reference deceleration signal, with the relative duration times of the first and second states of said control signal varying in response to the ac component of said actual deceleration signal and to the difference between said actual and reference deceleration signals;
   and brake means energized by said control signal, with the response time of said brake means and the frequency of the ac component being such that the brake means is responsive to the average of said control signal, as the control signal switches between said first and second states, to smoothly control the deceleration of said transporting means and cause said actual deceleration signal to more closely track said reference deceleration signal.

9. A transportation apparatus for providing smooth deceleration of a load, said transportation apparatus comprising:
   transporting means;
   sensor means for measuring the deceleration of said transporting means and for producing an actual deceleration signal, in analog form, representative thereof;
   means for producing an initiation signal when it is required to stop said transporting means;
   means for producing a triangular wave signal;
   means for adding said triangular wave signal and said actual deceleration signal to produce a modified deceleration signal;
   means responsive to said initiation signal for producing a reference deceleration signal;
   comparator means for comparing said reference deceleration and modified deceleration signals;
   said comparator means producing a control signal having a first state when said reference deceleration signal exceeds said modified deceleration signal, and having a second state when said modified deceleration signal exceeds said reference deceleration signal;
   said control signal switching between said first and second states as a function of the frequency of said triangular wave signal component of said modified deceleration signal and the difference between said modified deceleration signal and said reference signal;

and brake means responsive to said control signal for controlling the deceleration of said transporting means, with the response time of said brake means and the frequency of said triangular wave signal providing a braking effort responsive to the average of said control signal, to cause said actual deceleration signal to smoothly track said reference deceleration signal.

10. A transportation apparatus for providing smooth deceleration of a load, said transportation apparatus comprising:

transporting means;

sensor means for measuring the deceleration of said transportation means and for producing an actual deceleration signal representative thereof, wherein said actual deceleration signal has a high frequency component;

means for producing an initiation signal when it is required to stop said transporting means;

means responsive to said initiation signal for producing a reference deceleration signal;

comparator means for comparing said reference deceleration and actual deceleration signals;

said comparator means producing a control signal which is in a first state when said reference deceleration signal exceeds said actual deceleration signal, and in a second state when said actual deceleration signal exceeds said reference deceleration signal;

the high-frequency component of said actual deceleration signal causing the first and second states of said control signal to have varying durations;

and brake means responsive to said control signal for controlling the deceleration of said transporting means, with the response time of said brake means and the frequency of said high frequency component providing a braking effort responsive to the average of said control signal, to cause said actual deceleration signal to smoothly track said reference deceleration signal.

11. Transportation apparatus comprising: a drive unit;

transporting means driven by said drive unit;

sensor means for measuring the speed of said transporting means and for producing an actual speed signal in analog form, wherein said actual speed signal has dc and ac components;

means for producing an initiation signal when it is required to start said transportation apparatus;

means responsive to said initiation signal for producing a reference speed signal;

comparator means for comparing said reference speed and actual speed signals;

said comparator means producing a control signal having a first state when said reference speed signal exceeds said actual speed signal, and having a second state when said actual speed signal exceeds said reference speed signal;

said control signal switching between said first and second states as a function of the frequency of the ac component of said actual speed signal and the difference between said actual and reference speed signals;

said drive unit being responsive to the average of said control signal as the control signal switches between said first and second states, for controlling the speed of said transporting means while causing said actual speed signal to smoothly track said reference speed signal.

12. Transportation apparatus comprising: a drive unit;

transporting means driven by said drive unit;

sensor means for measuring the acceleration of said transporting means and for producing an actual acceleration signal in analog form, wherein said actual acceleration signal has dc and ac components;

means for producing an initiation signal when it is required to start said transportation apparatus;

means responsive to said initiation signal for producing a reference acceleration signal;

comparator means for comparing said reference acceleration and actual acceleration signals;

said comparator means producing a control signal having a first state when said reference acceleration signal exceeds said actual acceleration signal, and a second state when said actual acceleration signal exceeds said reference acceleration signal;

said control signal switching between said first and second states as a function of the frequency of the ac component of said actual acceleration signal and the difference between said actual acceleration signal and said reference signal;

said drive unit being responsive to the average of said control signal, as said control signal switches between said first and second states, for controlling the acceleration of said transporting means while causing said actual acceleration signal to smoothly track said reference acceleration signal.

* * * * *